United States Patent
Xiao et al.

(10) Patent No.: US 10,556,206 B2
(45) Date of Patent: Feb. 11, 2020

(54) ISOTOPE SEPARATION METHODS AND SYSTEMS

(71) Applicant: Savannah River Nuclear Solutions, LLC, Aiken, SC (US)

(72) Inventors: Xin Xiao, Augusta, GA (US); Henry T. Sessions, Aiken, SC (US); Lucas M. Angelette, Augusta, GA (US); Paul R. Beaumont, Aiken, SC (US); David W. Babineau, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 489 days.

(21) Appl. No.: 15/252,805

(22) Filed: Aug. 31, 2016

(65) Prior Publication Data
US 2018/0056240 A1    Mar. 1, 2018

(51) Int. Cl.
| | |
|---|---|
| *B01D 59/42* | (2006.01) |
| *C02F 1/469* | (2006.01) |
| *C02F 1/66* | (2006.01) |
| *B01D 71/02* | (2006.01) |
| *B01D 71/32* | (2006.01) |
| *B01D 69/08* | (2006.01) |
| *G21F 9/06* | (2006.01) |
| *C01B 4/00* | (2006.01) |

(Continued)

(52) U.S. Cl.
CPC .............. *B01D 59/42* (2013.01); *B01D 69/08* (2013.01); *B01D 71/021* (2013.01); *B01D 71/022* (2013.01); *B01D 71/32* (2013.01); *C01B 4/00* (2013.01); *C02F 1/469* (2013.01); *C02F 1/66* (2013.01); *G21F 9/06* (2013.01); *C02F 2101/006* (2013.01); *C02F 2101/10* (2013.01)

(58) Field of Classification Search
CPC ......... B01D 59/42; B01D 59/14; B01D 59/50
See application file for complete search history.

(56) References Cited

U.S. PATENT DOCUMENTS 3,485,737 A * 12/1969 Kakihana ............... B01D 59/42
                                                   204/536
5,954,968 A *  9/1999 Patterson ............... B01D 59/50
                                                   210/640

(Continued)

FOREIGN PATENT DOCUMENTS

| WO | WO2015/007382 | 1/2015 |
| WO | WO2015/145155 | 10/2015 |
| WO | WO2016/042309 | 3/2016 |

OTHER PUBLICATIONS

"Sieving Hydrogen Isotopes Through Two-Dimensional Crystals" by Hidalgo et al., Science 351(6268) pp. 68-70 (Jan. 2016).*

(Continued)

*Primary Examiner* — Steven A. Friday
(74) *Attorney, Agent, or Firm* — Dority & Manning, P.A.

(57) ABSTRACT

Methods and systems for the separation of isotopes from an aqueous stream are described as can be utilized in one embodiment to remove and recover tritium from contaminated water. Methods include counter-current flow of an aqueous stream on either side of a separation membrane. The separation membrane includes an isotope selective layer (e.g., graphene) and an ion conductive supporting layer (e.g., Nafion®). An electronic driving force encourages passage of isotopes selectively across the membrane to enrich the flow in the isotopes.

23 Claims, 3 Drawing Sheets

(51) Int. Cl.
*B01D 59/38* (2006.01)
*B01D 59/50* (2006.01)
*B01D 59/14* (2006.01)
*C02F 101/10* (2006.01)
*C02F 101/00* (2006.01)

(56) References Cited

U.S. PATENT DOCUMENTS

| | | | |
|---|---|---|---|
| 6,332,914 | B1 | 12/2001 | Lee |
| 9,266,750 | B2 | 2/2016 | Wilson |
| 2006/0065520 | A1* | 3/2006 | Ballantine ............ B01D 53/32 204/279 |
| 2014/0356270 | A1 | 12/2014 | Shmayda et al. |
| 2015/0174532 | A1 | 6/2015 | Wilson |
| 2016/0053387 | A1* | 2/2016 | Kutchcoskie .......... B01D 59/30 205/637 |
| 2016/0533387 | | 2/2016 | Kutchcoskie et al. |

OTHER PUBLICATIONS

Lozada-Hidalgo, etal.; "Sieving Hydrogen Isotopes Through Two-Dimensional Crystals," *Science* 351 (6268):68-70.

Poltavsky, etal.; "Quantum Tunneling of Thermal Protons ThroughPristine Graphene," *Quantum Tunnel thru Graphene* May 23, 2016 (5 pages).

Vishal, etal.; "Application of Graphene and Graphene Compounds for Environmental Remediation," *Science of Advanced Materials*, vol. 8, No. 3, Mar. 31, 2016 (3 pages)—Abstract.

Sevigny, etal., "Separation of Tritiated Water Using," *Fuel Cycle Res and Dev,* Jun. 30, 2015 (39 pages).

Tortello, etal.; "Nafion membranes with vertically-alignted CNTs for mixed proton and electron conduction," *Journal of Membrane Science,* Oct. 1, 2012 (1 page)—Abstract.

Jung, etal.; "Electro-active graphene—Nafion actuators," Carbon, Apr. 2011 (12 pages).

Rae, "Selecting Heavy Water Processes," Savannah River Nuclear Solutions, LLC; Publication Date Jun. 1, 1978; doi: 10.1021/bk-1978-0068.ch001 (26 pages).

Woods, "Tritium Removal by Membrane Separation" (2001). *University of Tennessee Honors Thesis Projects,* http://trace.tennessee.edu/utk_chanhonoproj/506 (35 pages).

Lin; "Tritium Enrichment by Isotope Separation Technique," Oak Ridge National Laboratory, Dec. 1972, ORNL-TM-3976, (34 pages).

King, et al.; "Concepts for Detritiation of Waste Liquids (U)," Paper for oral presentation at Waste Management '91, Tuscson, AZ Feb. 24-28, 1991; (20 pages).

Geniesse, et al.; "2009 Evaluation of Tritium Removal and Mitigation Technologies for Wastewater Treatment," Prepared for US Dept. of Energy, Feb. 2009; DOE/RL-2009-18, Revision 0 (51 pages).

Fulbright, et al.; "Status and Practicality of Detritiation and Tritium Production Strategies for Environmental Remediation", Savannah River Site, WSRC-RP-96-0075, 1996; (293 pages).

* cited by examiner

ISOTOPE SEPARATION METHODS AND SYSTEMS

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

Tritium is a low energy beta emitter, and while it is not dangerous externally, it is a radiation hazard upon inhalation, ingestion or absorption. Tritium can be produced in nuclear power generation as a by-product of the fission of uranium-235, plutonium-239, and uranium-233 as well as by neutron activation of lithium-6. In heavy water moderated and cooled reactors tritium can be produced when a deuterium nucleus captures a neutron. Though relatively small amounts of tritium are produced via such routes, it readily binds hydroxyl radicals to form tritiated water. As such, tritiated water can build up over time within cooling water as well as within water used in storage pools at nuclear power generating facilities which can lead to environmental contamination. Accidental release of tritiated water from nuclear power generation facilities is understood to be the major source for aqueous release of radioactivity to surface streams and rivers, and the 2011 Japanese earthquake resulted in the release of millions of gallons of tritium-contaminated water from the Fukushima Daiichi nuclear plant. Tritium contamination of groundwater in the vicinity of nuclear power generation facilities has led to public outcry and negative publicity for the nuclear power industry.

Methods that have been developed for the removal of tritium from contaminated water include water distillation, cryogenic distillation, electrolysis, and gas/liquid catalytic exchange. Unfortunately, problems exist with such methods. For instance, water distillation is energy intensive, as the water ($H_2O$) vapor pressure is only 1.056 times of that of tritiated water (HTO). Due to a high reflux ratio of about 30, huge reboiler duty and large column diameter are required. The small separation factor also requires an extreme column height for the hundreds of theoretical plates necessary for the process. Cryogenic distillation has shown promise, but the successful production experience of more recently developed technologies such as the thermal cycling adsorption process (TCAP) exhibit improved performance. Electrolysis has a very good tritium separation factor however it is difficult to stage and is very energy intensive. Catalytic exchange has been combined with electrolysis in a process known as Combined Electrolysis Catalytic Exchange (CECE), which is the leading production-scale process to decontaminate tritiated water. Unfortunately, the process requires a high concentration of tritium in the treatment water and the current capacity is still orders of magnitudes smaller than the need in many facilities.

Effective treatment of tritiated water is technically very challenging due to the large volume and low contaminant concentration of existing tritiated water. For instance, existing storage facilities are more than 90% full and contain hundreds of thousands of tons of contaminated water for treatment. There are simply no current methods or systems that can handle such volume.

What are needed in the art are methods and systems that can separate isotopes such as tritium from contaminated water sources efficiently. High isotope selectivity (or separation factor) and scalable process are important components of the need.

SUMMARY

Aspects and advantages of the invention will be set forth in part in the following description, or may be obvious from the description, or may be learned through practice of the invention.

According to one embodiment, disclosed is a process for separation of isotopes in an aqueous source. According to one particular embodiment, the process can be utilized for removal and recovery of hydrogen isotopes, e.g., tritium, from contaminated water. The process includes contacting the first side of a separation membrane with a first aqueous flow. This flow can pass from a first end of the separation membrane to a second end of the separation membrane while in contact with this first side. The method also includes contacting the second, opposite side of the separation membrane with a second aqueous flow. This second aqueous flow is counter-current to the first aqueous flow. Thus, it passes along the second side of the membrane from the second end of the separation membrane to the first end of the separation membrane.

The method also includes applying a voltage across the separation membrane, i.e., from the first side to the second side of the separation membrane. The separation membrane is a multi-layer membrane that includes an isotope selective layer and an ion conductive supporting layer. Under the driving force of the applied voltage the separation membrane can conduct ions (e.g., protons) with isotope selectivity. Through combination of the isotope selectivity of the separation membrane with the counter-current flow, each flow stream can be enriched in selected isotopes from one side to the other of the separation membrane as well as from one end to the other end of the separation membrane. Recirculation of a flow through the system, optionally with continuous or periodic product outflow and source inflow, can further enrich the product stream(s) in isotopes.

Systems for carrying out an isotope separation process are also disclosed. For instance, a system can include a separation device (e.g., a separation column or a separation module) that in turn includes a first flow inlet and a first flow outlet that define a first flow path there between. The separation column can also include a second flow inlet and a second flow outlet that define a second flow path there between. The inlets and outlets can be arranged with respect to one another such that the first and second flow paths run counter-current to one another. A system can also include a separation membrane is selective with regard to isotope ions and that is located so as to separate the two flow paths. The separation membrane can include an isotope selective layer and an ion conductive supporting layer. In addition, a system can include an electric circuit that is configured to apply a voltage between the first side of the separation membrane and the second side of the separation membrane.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
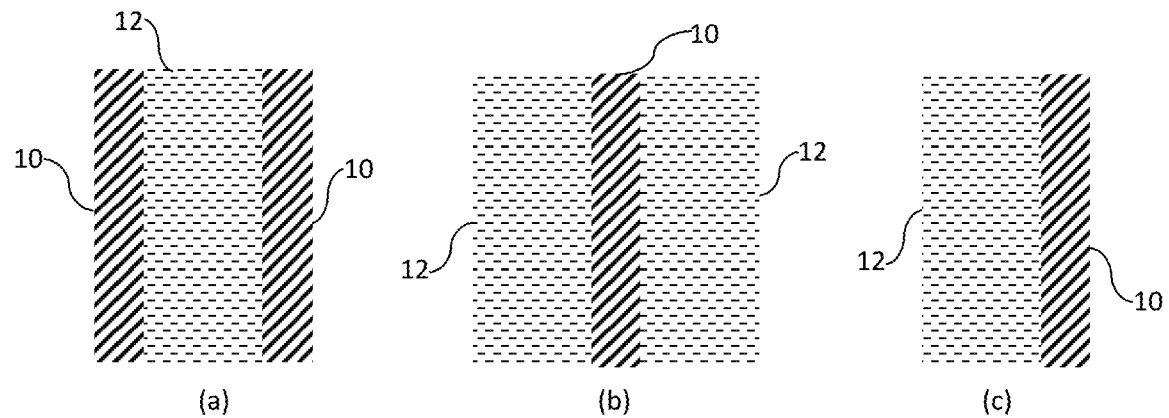
FIG. 1 illustrates three different configurations for a separation membrane as described herein.

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein are methods and systems directed to the separation of isotopes from an aqueous source. For instance, in one particular embodiment, disclosed are methods and systems that can be utilized to remove and recover tritium from contaminated water. The methods are not limited to tritium recovery, however, and can be used to concentrate one or more isotopes of other types from an aqueous stream. For instance, methods can be utilized to separate deuterium from one or both of tritium and hydrogen as well as separation of oxygen isotopes from one another. For example, given a feed stream that includes hydrogen, deuterium, and tritium, a method can provide a first product stream enriched in hydrogen and a second product stream enriched in deuterium and tritium. Additional processing, for instance through a second separation protocol, can further separate the isotopes of the second product stream to provide a stream enriched in deuterium and a stream enriched in tritium. In certain embodiments, disclosed methods can exhibit a separation factor for hydrogen concentration to deuterium concentration (i.e., [H]/[D]) of about 10, for hydrogen concentration to tritium concentration ([H]/[T]) of about 58 and for deuterium concentration to tritium concentration ([D]/[T]) of about 6. Likewise, the methods can be utilized to separate oxygen isotopes such as $^{16}O$, $^{17}O$, $^{18}O$, etc. from one other.

Beneficially, the methods can be carried out at ambient temperature and pressures and require no electrolysis of the water prior to the separation process. Moreover, the system components, and in particular the separation membrane, can exhibit excellent structural integrity over many cycles and can provide in a single stage separation effects only possible with many hundreds of separate stage cascades using more traditional isotope separation approaches.

The separation method is carried out by use of a separation membrane that exhibits ionic conductivity as well as isotope selectivity. In particular, the separation membrane can include at least one layer that exhibits isotope selectivity. In general, an isotope selective layer can include from 1 to about 5 (e.g., 1 to 3) atomic or molecular layers of a homogeneous crystalline material forming an essentially two dimensional structure. As utilized herein, the term "crystalline" generally refers to a material in which the atoms or molecules are arranged in a regular, periodic manner. For instance, the isotope selective layer can include from 1 to 3 layers of graphene, hexagonal boron nitride, or a transition metal dichalcogenide. Dichalcogenides can generally include those of the type $MX_2$ in which M may be Mo, W, Nb, V, Ta, Ti, Zr, Hf, Tc, or Re, and X may be S, Se, or Te. A dichalcogenide may be, for example, $MoS_2$, $MoSe_2$, $MoTe_2$, $WS_2$, $WSe_2$, $WTe_2$, $ZrS_2$, $ZrSe_2$, $HfS_2$, $HfSe_2$, $NbSe_2$, or $ReSe_2$.

The isotope selective layer can be monolithic across a separation membrane. In particular, while the layer can be either monocrystalline or polycrystalline across a separation membrane, it will be continuous and essentially free of large defective sites that could interfere with the selectivity of the layer for the ionic isotopes. Thus, selected ions can pass through the body of the layer and materials that are not favorably passed through the material (i.e., other isotopes) can be prevented from passage across the separation membrane.

The continuous isotopic selective layer differs from other membranes formed of such two dimensional materials in that such materials are generally formed of a plurality of individual flakes or discs attached to an underlying substrate. These materials can allow for passage of compounds at the junctions formed between individual flakes. In contrast, the isotope selective layer of the disclosed systems is continuous across the separation membrane so as to allow preferential passage of selected isotope ions only through the body of the 2D material itself.

The isotope selective layer may be formed according to standard methodology as is known in the art for preparing such materials. By way of example, an isotope selective layer may be formed according to a chemical vapor deposition (CVD) method or an atomic layer deposition (ALD) method. Certain isotope selective layers, and in particular graphene, may be formed according to a pyrolysis methodology, as is known. Various methods for forming graphene sheets have been described, for instance in U.S. Pat. Nos. 6,667,100; 7,071,258; 8,734,683; 7,988,941; and 8,632,855; all of which are incorporated herein by reference. Dichalcogenide layers can be formed in one embodiment according to an ALD method, for instance as described in International Patent Application Publication No. WO2015/091781, which is incorporated herein by reference.

As stated, the isotope selective layer is about 5 atomic or molecular layers or less in thickness. As such, in order to provide suitable structural integrity to the separation membrane and allow for scale-up of a system, the separation membrane can also include an ion conductive supportive layer. In one embodiment, an ion conductive supporting layer can be a polymeric layer. An ion conductive polymeric layer can include one or more ion conductive polymers in conjunction with any additives as are generally known in the art. Such ion conductive polymers are known in the art and can include perfluorosulfonic acid polymers such as, without limitation, sulfonated polyetheretherketone, sulfonated polysulfone, sulfonated polyvinylacetate, sulfonated polyetherimide, polybenzimidazole, and the like. In one embodiment, a Nafion® polymeric layer can be utilized as an ion conductive supporting layer. Nafion® is a sulfonated tetrafluoroethylene based fluoropolymer. The Nafion® membrane technology is well known in the art and is described in U.S. Pat. Nos. 3,282,875 and 4,330,654, which are incorporated herein by reference. Other ion conductive polymers can be utilized including, without limitation, polyamide, polyamide-imide, polyimide, polyether ketone, polyether ether ketone, polyphenylene, polyphenylene ether, polyester, polycarbonate, polyethylene, polypropylene, polyester, polystyrene, polyacetal, polysulfone and poly (meth)acrylic acid derivatives, which all have ion exchange groups, as well as block copolymers composed of ion onductive blocks and ion nonconductive blocks, all of which may be used in forming an ion conductive supporting layer.

Another type of ion conductive layer, Gore-Select® (commercially available from W.L. Gore), can be utilized. Gore-Select® membranes are further detailed in U.S. Pat. Nos. 5,635,041, 5,547,551 and 5,599,614, all of which are incorporated herein by reference. Gore also discloses a composite membrane consisting of a porous Teflon® film filled with a Nafion® or Nafion®-like ion-conducting solution that can be utilized in a system as described herein. Further, Gore-Select®, as well as many other types of perfluorinated ion conducting membranes (e.g., Aciplex from Asahi Chemical, Flemion® from Asahi Glass, Japan) can be utilized.

In another embodiment, the ion conductive layer can include an ion conductive ceramic. In one embodiment, the ion conductive ceramic can be designed for relatively low temperature operation in an aqueous environment. An ion conductive ceramic can be, for example, a proton conductive ceramic or an oxygen ion conductive ceramic as are known in the art.

By way of example, a proton conductive ceramic can be a doped perovskite of the general composition $$A_{l-x-\alpha}P_xB_{1-y}Q_yO_{3-\delta}$$

In which A is a bivalent cation such as Ba, Sr, Ca or Mg and combinations thereof, P is an A-site dopant, which may be a cation such as Pr, Sm, Er or other cations belonging to the lanthanide series. B is a tetravalent cation which may be either an element in Group IV of the period table (e.g. Ti, Zr) or an element in the lanthanide series of the periodic table (e.g. Ce, La). Q is a B-site dopant which may be either an element in Group III of the period table (e.g. Sc, Y) or another element (other than B) in the lanthanide series of the periodic table (e.g. Eu, Nd, Gd, Yb). $\alpha$ represents the A-site non-stoichiometry (deficiency), and $\delta$ is an oxygen deficiency. In one embodiment, $\alpha$ can be from about 0 to about 0.1 and $\delta$ can be from about 0 to about 0.3. Some embodiments can include compounds with specific combination of elements on the A and B sites represented by the chemical formulas $Ba_{1-x-\epsilon}P_xCe_{1-y}Q_yO_{3-\delta}$, $Sr_{1-x-\epsilon}P_xCe_{1-y}Q_yO_{3-\delta}$, and $Ca_{1-x-\epsilon}P_xTi_{1-y}Q_yO_{3-\delta}$. Other embodiments can include an A-site deficiency $\epsilon$, where $0 \le \alpha \le 0.1$ and where $0 \le \epsilon \le 0.3$. It should be understood that P and Q may represent more than one element of the type specified above, and addition of more than one dopant at the A and B site fall within the scope of this disclosure.

In another embodiment, a proton conducting ceramic may be a complex perovskite. For example, a complex perovskite can be of the types $A_2(B'_{1+\beta}B''_{1-\beta})O_{6-\lambda}$ or $A_3(B'_{1+\varphi}B''_{2-\varphi})O_{9-\lambda}$, in which A ions are always bivalent as described above, B' ions are trivalent (Eg. Y, Ga, Sc, In, Yb, Nd) or tetravalent (e.g. Zr, Ti, Ce), and B" ions are pentavalent (e.g. Bi, Nb). Generally, $0 \le \beta \le 0.2$ and $0 \le \varphi \le 0.2$. $\lambda$ may range from about 0 to about 0.2.

In yet another embodiment, a proton conducting ceramic can be a pyrochlore structure $(A_{2-\gamma}A''_y)_2(B_{2-\eta}R_\eta)O_{7-\lambda}$ where A is a bivalent cation, A" is another bivalent cation, B is a tetravalent cation as described above, and R is a bivalent cation (e.g. Ca). In one embodiment, A" and R can be the same cation. Generally, $0 \le \gamma \le 0.3$ and $0 \le \eta \le 0.3$.

In one embodiment, an oxygen ion conducting ceramic can be utilized in an ion conductive layer. In some embodiments, the oxygen ion conducting ceramic of the ion conducting layer can be a pure ionic conducting ceramic, such as one comprising doped zirconia or doped ceria. In other embodiments, the oxygen ion conducting ceramic can be a mixed conductive material, such as one comprising $SrCoO_3$, $SrFeO_3$, $La_{0.8}Sr_{02}FeO_{3-S}$, $BaCe_{0.15}Fe_{0.05}O_{3-\delta}$, or a combination thereof. In some embodiments, the oxygen ion conducting ceramic can include perovskites of rare earths like Sr, La, Ce, or Yb, in combination with group VIII elements such as Fe and Co.

For example, a perovskite oxygen ion conducting ceramic can have the general formula:

$$A_xA'_{x'}A''_{x''}B_yB'_{y'}B''_{y''}O_{3-\delta}$$

wherein
x+x'+x"=1, and
y+y'+y"=1, and
$\delta$ is a number, which renders the composition charge neutral
A, A' and A" are each is one or more metals selected from the group of lanthanide metals and/or a divalent metal, preferably from the group IIA of the Periodic Table.
B, B' and B" are each is a metal selected from the group of transition metals, group IIIA and noble metals of group VIII of the Periodic Table.

In one embodiment, an oxygen ion conducting ceramic can be a superstructural perovskite material having a Brownmillerite structure with the general chemical formula:

$$A_xA'_{x'}A''_{x''}B_yB'_{y'}B''_{y''}O_{2.5}$$

wherein
A, A', A", B, B', B" are as defined above and
x+x'+x"≤1 and/or
y+y'+y"≤1

In another embodiment, an oxygen ion conducting ceramic can have a pyroclore structure having the general chemical formula:

$$A_xA'_{x'}A''_{x''}B_yB'_{y'}B''_{y''}O_{3.5}$$

wherein
A, A', A", B, B', B" are as defined above and
x+x'+x"≤1 and/or
y+y'+y"≤1

A non-perovskite oxygen ion conducting ceramic can be represented by the formula:

$$(A_xA'_{x'}A''_{x''})_a(B_yB'_{y'}B''_{y''})_bO_{3-\delta}$$

wherein
A, A', A", B, B', B" are as defined above and
x+x'+x"≤1 and/or
y+y'+y"≤1
a is a number in a range from 1 to 4
b is a number in a range from 1-10 and
$\delta$ is a number, which renders the composition charge neutral.

In another embodiment, an oxygen ion conducting ceramic can be a mixed metal oxide composition represented by $$Sr_\alpha(Fe_{1-x}Co_x)_{\alpha+\beta}O_\delta$$

wherein
  x is a number in a range from 0.01 to about 1
  α is a number in a range from about 1 to about 4 such that $1<(\alpha+\beta)/\alpha\le 6$, and
  δ is a number which renders the compound charge neutral.

In general, an ion conductive supporting layer can be relatively thin, so as to not impede transport of the selected isotope ions across the separation membrane. For instance, and depending upon the particular materials of the layer, in one embodiment, an ion conductive supporting layer can be about 500 micrometers (μm) or less in thickness, e.g., about 200 μm or less, about 100 μm or less, or about 50 μm or less in some embodiments.

The separation membrane can include one or more individual layers of the various materials. By way of example, FIG. 1 illustrates three representative examples for different configurations of a separation membrane. As illustrated in FIG. 1, a separation membrane can include one or more isotope selective layers 10 and one or more ion conductive supporting layers 12. For instance, the embodiment illustrated at (a) of FIG. 1 includes two isotope selective layers 10 located on either side of an ion conductive supporting layer 12. Moreover, as discussed above, each of the isotope selective layers 10 can include about 5 or less atomic or molecular layers of the isotope selective materials. For instance, an isotope selective layer 10 can include from 1 to about 5 graphene sheets in a single layer. Moreover, multiple isotope selective layers 10 of a membrane can be the same or different from one another.

In another configuration, illustrated at (b) in FIG. 1, a separation membrane can include a single isotope selective layer 10 sandwiched between two ion conductive supporting layers 12, which can be the same or different as one another. It should be understood however that the separation membrane is not limited to a combination of three layers. For instance, and as illustrated at (c) of FIG. 1, a separation membrane can be formed of two layers including an isotope selective layer adjacent to an ion conductive supporting layer 12. Additional layers are also encompassed in a separation membrane. However, in order to maintain desired ionic flow across the separation membrane, a separation membrane will generally include no more than about 5 layers.

The individual layers of a separation membrane can be held adjacent to one another according to any methodology. For instance, in one embodiment, an isotope selective layer can be formed on a surface of a previously formed ion conductive supporting layer. Similarly, an ion conductive supporting layer can be formed, e.g., extruded, on a surface of a previously formed isotope selective layer. Alternatively, the previously formed individual layers can be simply located adjacent to one another prior to assembly in formation of a separation device. In another embodiment, individual layers of a separation membrane can be adhered to one another by use of an adhesive, a melt bond, etc. in such a fashion that ionic flow across the membrane is not impeded. For instance, the layers can be adhered to one another at edges or at periodic locations across the membrane surface.

An electronic potential can be utilized to drive selected isotope ions across the membrane during use of a device. This can differ from previously known separation schemes that have utilized a concentration difference or a thermal driving force. Through utilization of an electronic driving force, the disclosed methods can provide higher separation factors at lower energy input as compared to previously utilized concentration or thermal driven methodologies.

Figure 2:
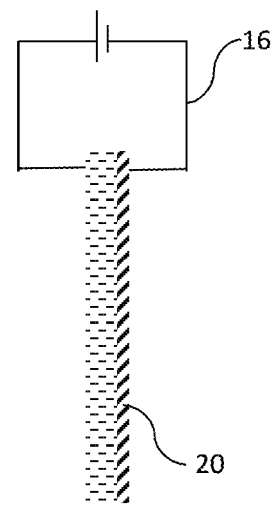
FIG. 2 illustrates an electric circuit across a separation membrane as can provide a driving force for selective separation of isotope ions.

A drive voltage can be applied across the separation membrane to encourage passage of isotope ions across the isotope selective layer of the separation membrane. Accordingly, a system can include an electric circuit that is in electrical communication with the separation membrane so as to apply a voltage across the membrane. One embodiment of an electric circuit 16 is illustrated in FIG. 2. As shown, the circuit 16 can include a power source in electrical communication with either side of a separation membrane 20 as known.

In one embodiment, in order to establish a voltage across the membrane 20, electrodes can be located on either side of the separation membrane. The electrodes can generally include a current collector capable of encouraging the drive voltage and injection of the selected isotope ions through the separation membrane. In general, a suitable drive voltage can be about 20 Volts or less, for instance about 5V or less in some embodiments. In some embodiments a suitable drive voltage can be less, for instance about 1.5V or less, about 1.25V (e.g., about 1.23V) or less, about 1V or less, about 500 mV or less, or about 200 mV or less in some embodiments.

An electrode can include a current collector, e.g., a metal, in electrical communication with the separation membrane. By way of example and without limitation, an electrode can include a material that is resistant to chemical attack such as platinum, silver, gold, iridium, osmium, palladium, rhodium, ruthenium, copper, stainless steel, glassy carbon, graphite, graphene, other transition metals, etc., as well as combinations of materials.

Optionally, an electrode can include a material that can catalyze formation of ions at the separation membrane. For instance, a metal such as platinum can be utilized, for instance in the form of the metal hydride, that can function not only as a current collector, but can also catalyze formation of hydrogen ions at the separation membrane. In another embodiment, an electrode can include a current collector and a catalyst as separate materials that can be provided as a composite in conjunction with a binder as is known in the art.

In one particular embodiment, one or both of the electrodes can incorporate a component of the separation membrane. For instance, in some embodiments, the separation membrane can include a graphite layer as discussed above, and graphite can also be utilized as an electrode or as a component of an electrode. For example, in one embodiment as illustrated at FIG. 1 (a), one or both of the isotope selective layers 10 can include a graphite layer at the exterior of the separation membrane. In this embodiment, the graphite layer itself can be utilized as the electrode in application of a driving voltage across the separation membrane. Similarly, in the embodiment illustrated at (c) of FIG. 1, an electrically conductive isotope selective layer 10 located on one exterior surface of the separation membrane can be utilized as an electrode of the system and a second electrode, e.g., a platinum hydride electrode can be connected to the second side of the separation membrane, in electrical connection with the ion conductive supportive layer 12.

To obtain a highly efficient isotope separation, a separation membrane can be provided as a component of a separation device. More specifically, the separation device can be configured for a counter current flow on either side of the separation membrane, which can augment a separation scheme and achieve efficiencies of multi-stage membrane separation cascades in a single separation stage.

Figure 3:
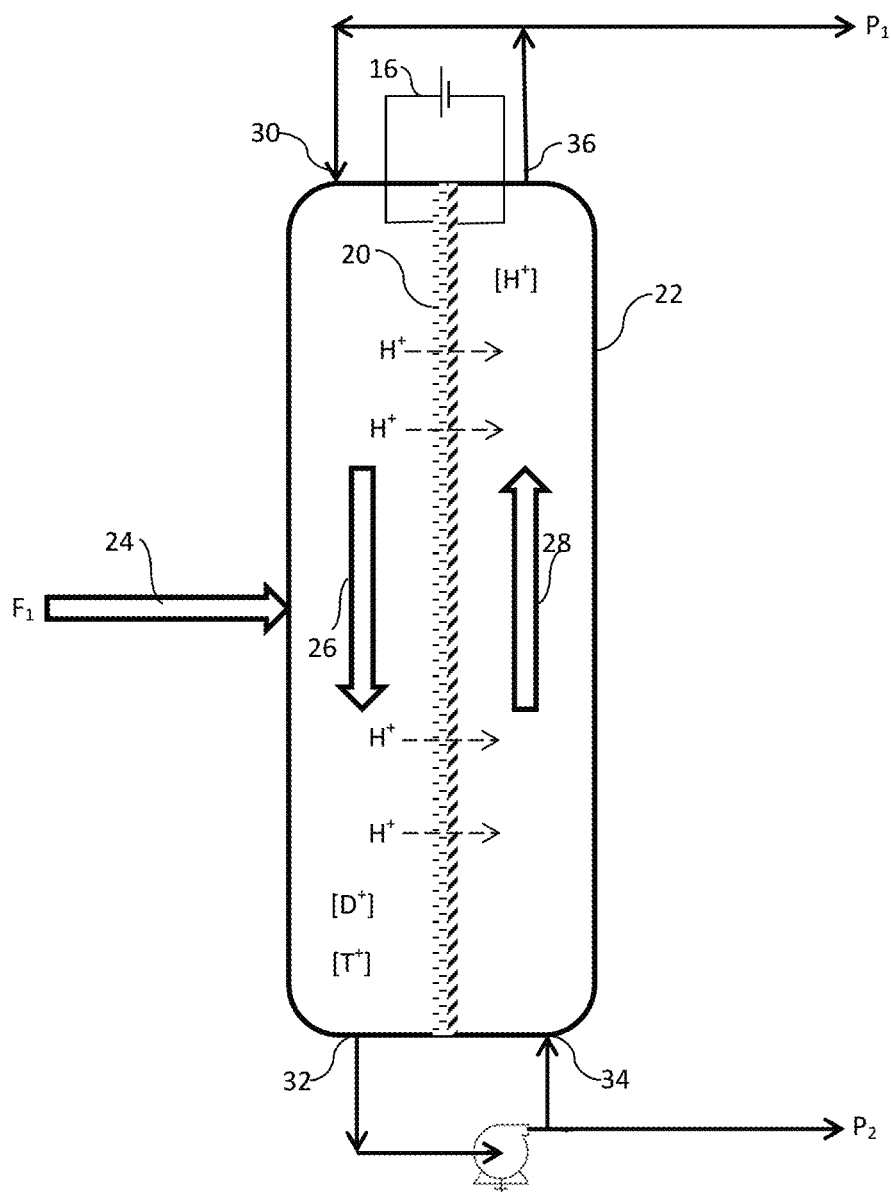
FIG. 3 illustrates one embodiment of a separation column for use as described herein.

FIG. 3 illustrates one embodiment of a separation device that can be utilized to separate and recover a selected isotope. This particular embodiment includes a separation column 22 in separation of hydrogen isotopes. The system can include an inlet 24 through which a feed stream $F_1$ can be provided. Though illustrated as a single feed into a middle section of the column 22, it should be understood that the location and number of feed streams is not critical to a process. For instance, the initial feed to a system can be in a single or multiple different feed streams and can enter the system as a separate stream or in conjunction with a recycle stream, as discussed further herein.

The feed stream $F_1$ can include a mixture of isotopes to be separated. In one embodiment the feed stream can be a contaminated water stream that can include tritium and/or deuterium. For instance the feed stream can include contaminated water from a nuclear power generation plant such as cooling water or from storage water. A feed stream can optionally be provided from an environmental source such as a contaminated stream or lake. The feed stream can optionally be pre-processed prior to the separation stage, for instance to remove solids, salts, etc. that could interfere with the separation process. Pre-processing of a feed stream can also include modification of the feed stream to encourage ion formation. For instance, when considering separation of hydrogen isotopes from a feed stream, it can be beneficial to acidify the feed stream, e.g., through addition of an acid (e.g., addition of a dilute as at a concentration of from about 0.01 M to about 5 M, for instance about 0.1 M HCl or DCl solution) to increase ion concentration in the feed stream.

A separation membrane 20 is held in the separation column 22 so as to divide the column and provide a first flow path 26 and a second flow path 28. As shown, the flow paths on either side of the separation membrane 20 are counter current to one another.

The separation membrane 20 is in electrical communication with an electrical circuit 16 including a power supply that can apply a driving voltage across the separation membrane, as shown and discussed above. In this particular embodiment, the isotope selective layer of the separation membrane can selectively transport protons across the separation membrane over the tritium and deuterium ions. As such, the aqueous flow along the first flow path 26 can become enriched in deuterium and tritium on one side of the column (the left side as illustrated in FIG. 3) as the protons selectively pass across the separation membrane and the flow path 28 becomes enriched in hydrogen. In addition, due to the counter current flow of the streams within the column, the aqueous flow 26 can also become enriched in deuterium and tritium from the top of the column (i.e., the first end of the separation membrane 20) to the bottom of the column (i.e., the second end of the separation membrane 20) while the aqueous flow 28 becomes enriched in hydrogen from the bottom of the column to the top of the column.

A recirculation flow rate can vary depending upon specific characteristics of a process (e.g., the membrane isotope flux and area) in order to achieve the maximum number of equivalent separation stages. For instance, if the recirculation rate is too high, the entire column 22 can become a stirring tank in which isotope concentration would be uniform everywhere and no separation is achieved at all. On the other hand, if the recirculation rate is zero, the two sides of the membrane 20 will achieve one stage of isotope separation, which is in most cases inadequate. In general, the recirculation flow rate can be slow enough to allow stream 26 and stream 28 to establish a stable isotope concentration gradient (close to isotope separation equilibrium) at any given location of the membrane 20, while maintaining laminate flow. Higher recirculation flow rate can be used to achieve higher throughput as long as the isotope concentration gradient is established across the membrane.

To further improve efficiency of a system, the two flow streams 26, 28 can be recirculated around the separation membrane. For instance, the first flow stream 26 can enter the separation column 22 at an inlet 30 and exit at an outlet 32 that allows the flow to pass along the first side of the separation membrane from one end to the other. Upon exit, this flow stream can be recirculated back to an inlet 34 for the second flow stream 28 and this stream can then pass along the second side of the separation membrane 20 from end to end and exit at the outlet 36. This stream can then be recirculated again as shown.

This recirculation can promote even higher isotope concentration on each side of the separation membrane according to the equilibrium constant of the system. Once the system reaches steady state, the two product streams $P_1$ and $P_2$ can be pulled off as shown. In a continuous process, upon steady state, a feed stream $F_1$ can be introduced into the column as the product streams $P_1$ and $P_2$ are pulled off.

Depending upon the number and types of isotopes included in the feed stream, additional downstream stages can be incorporated into a system. For instance, in the illustrated embodiment, the product stream $P_2$ can be enriched in deuterium and tritium (e.g., HDO, $D_2O$, HTO, $T_2O$, DTO). As such, in one embodiment a second separation stage can be carried out in which the feed stream is the $P_2$ stream of FIG. 3 and the two product streams from this separation stage can be enriched in deuterium and tritium, respectively.

Figure 4:
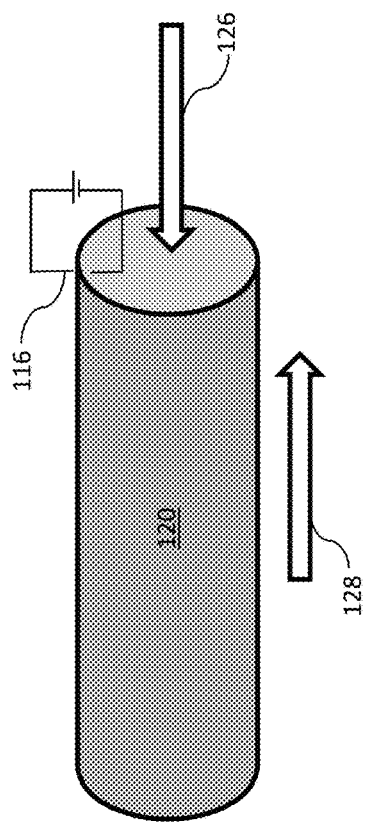
FIG. 4 illustrates a tubular separation membrane for use as described herein.

A separation device is not limited to a separation column that incorporates generally flat, planar separation membranes. For instance, and as illustrated in FIG. 4, in one embodiment, a separation membrane 120 can have a tubular configuration. In this embodiment, the separation membrane 120 can be arranged such that the first flow stream 126 contacts a first side of the separation membrane 120, which in this embodiment, is the inner surface of the tubular membrane, and the second flow stream 128 can contact the second, or outer side of the separation membrane 120.

A tubular separation membrane 120 can be held in electrical communication with an electric circuit 116 as discussed above to provide a driving force that encourages transport of the selected ions across the separation membrane 120. A tubular separation membrane can have a convenient size that can increase contact surface area between the flow streams and the membrane. For instance, in one embodiment, a tubular separation membrane can be in the form of a hollow fiber membrane that can have a high surface area to volume ratio. For example, a hollow fiber separation membrane can have an inside diameter of about 3 cm or less, or about 1 cm in less in some embodiments. Smaller hollow fiber membranes are also encompassed herein, for instance having an inner diameter of about 1 mm or less, or about 500 nm or less in some embodiments.

Figure 5:
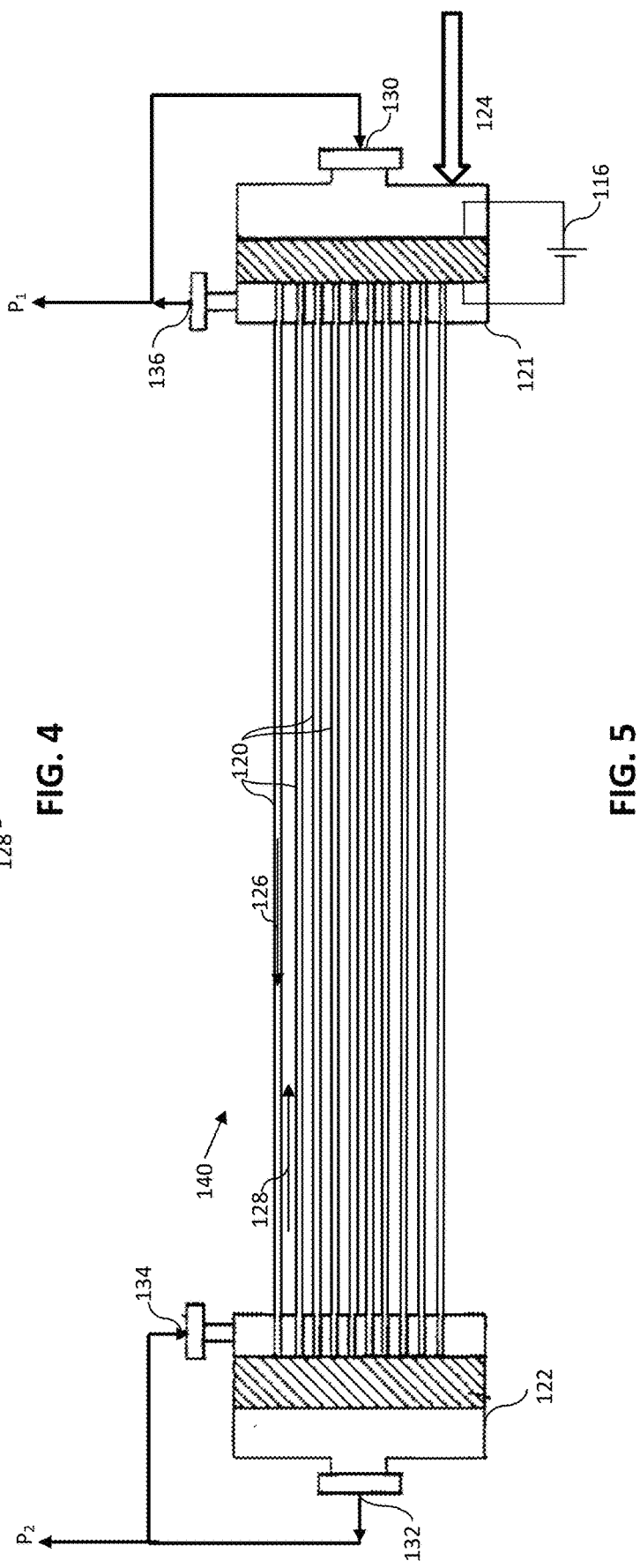
FIG. 5 illustrates a separation module including a plurality of tubular separation membranes as described herein.

To further improve efficiency, a plurality of separation membranes can be combined in a single stage of a separation system. By way of example, FIG. 5 illustrates a separation module 140 as may be utilized. Separation module 140 includes a large number of hollow fiber separation membranes 120 arranged together in a single housing as shown. Each hollow fiber separation membrane 120 can carry a first flow stream 126 along the interior of the hollow fiber separation membrane 120 from the first end 121 of the module 140 to the second end 122 of the module 140. At the second end 122 of the module 140, the individual flow streams 126 can be combined together to pass out of the outlet 132 where the flow can be circulated back to an inlet 134. The inlet 134 provides for a second flow stream 128 to pass from the second end 122 of the module 140 to the first end 121 of the module with the flow in contact with the second, outer side of the hollow fiber separation membranes 120. The second flow stream 128 can exit the module at an exit 136 and the circulated back to the first flow streams 126 via inlet 130 as shown.

The separation module 140 can also include feed inlet 124 and product outlets $P_1$, $P_2$, as discussed above. The system can also include an electric circuit 116 that can be in electrical communication with each of the individual hollow fiber separation membranes 120 to provide a driving force for the selected ions across the separation membranes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for removal and recovery of an isotope from an aqueous source, the system comprising:
    a separation device, the separation device including:
        a first flow inlet and a first flow outlet;
        a plurality of hollow fiber separation membranes between the first flow inlet and the first flow outlet, each hollow fiber separation membrane including an isotope selective layer and an ion conductive supporting layer, each hollow fiber separation membrane including an exterior surface and an interior surface that surrounds a hollow tubular interior, wherein the first flow inlet is in fluid communication with and upstream of the hollow tubular interior of each of the hollow fiber separation membranes, and the first flow outlet is in fluid communication with and downstream of the hollow tubular interior of each of the hollow fiber separation membranes;
        a second flow inlet and a second flow outlet defining a first flow path there between, the first flow path contacting the exterior surface of each of the hollow fiber separation membranes, wherein the separation device is configured such that flow from the first flow inlet to the first flow outlet is counter-current to the first flow path; and
    an electric circuit in electrical communication with each of the hollow fiber separation membranes and configured to apply a voltage between the interior surface and the exterior surface of each of the hollow fiber separation membranes.
2. The system of claim 1, further comprising a second flow path connecting the first flow outlet to the second flow inlet and a third flow path connecting the second flow outlet to the first flow inlet.
3. The system of claim 1, wherein the isotope selective layer includes from 1 to about 5 atomic or molecular layers of a homogeneous crystalline material.
4. The system of claim 3, wherein the isotope selective layer includes from 1 to about 5 layers of graphene, hexagonal boron nitride, or a transition metal dichalcogenide.
5. The system of claim 4, wherein the isotope selective layer comprises from 1 to about 3 graphene layers.
6. The system of claim 1, wherein the ion conductive supporting layer comprises an ion conductive polymer.
7. The system of claim 6, wherein the ion conductive supporting layer comprises a sulfonated tetrafluoroethylene based flouropolymer.
8. The system of claim 1, wherein the ion conductive supporting layer comprises an ion conductive ceramic.
9. The system of claim 1, the system further comprising one or more electrodes providing electrical communication between the electric circuit and each of the hollow fiber separation membranes.
10. The system of claim 9, wherein one of the one or more electrodes comprises the isotope selective layer of one or more of the hollow fiber separation membranes.
11. The system of claim 1, wherein the isotope selective layer of each of the hollow fiber separation membranes is a hydrogen isotope selective layer.
12. The system of claim 1, wherein the ion conductive supporting layer of each of the hollow fiber separation membranes comprises a perfluorosulfonic acid polymer.
13. The system of claim 1, wherein the ion conductive supporting layer of each of the hollow fiber separation membranes is a proton conductive supporting layer or an oxygen ion conductive supporting layer.
14. A process for removal and recovery of an isotope from an aqueous source by use of the system of claim 1, the method comprising:
    contacting the interior surfaces of the hollow fiber separation membranes with a first aqueous flow, the first aqueous flow comprising an isotope, the first aqueous flow passing from the first flow inlet to the first flow outlet and through each of the hollow fiber separation membranes;
    contacting the exterior surfaces of the hollow fiber separation membranes with a second aqueous flow, the second aqueous flow being counter-current to the first aqueous flow and passing from the second flow inlet to the second flow outlet; and
    applying a voltage across each of the hollow fiber separation membranes from the interior surface to the exterior surface, the voltage providing a driving force to selectively conduct the isotope across the hollow fiber separation membranes.
15. The method of claim 14, further comprising circulating the first aqueous flow to the second aqueous flow and the second aqueous flow to the first aqueous flow in a recirculation path.
16. The method of claim 14, further comprising feeding a feed stream into the first or second aqueous flow.
17. The method of claim 14, further comprising pulling at least one product stream off of the first or second aqueous flow.
18. The method of claim 14, wherein the isotope is a hydrogen isotope.
19. The method of claim 14, wherein the voltage is about 20 Volts or less.
20. The method of claim 14, further comprising pre-treating the first or second aqueous stream.
21. The method of claim 20, wherein the pre-treatment comprises acidifying the stream.
22. The method of claim 14, wherein the aqueous source comprises tritiated water.

23. A system for removal and recovery of an isotope from an aqueous source, the system comprising:
- a separation device, the separation device including
  - a first flow inlet and a first flow outlet defining a first flow path there between;
  - a second flow inlet and a second flow outlet defining a second flow path there between, wherein the first flow path and the second flow path are counter-current to one another;
  - a separation membrane, the separation membrane separating the first flow path and the second flow path, the separation membrane including an isotope selective layer and an ion conductive supporting layer, the separation membrane including a first side and an opposite second side, the first side facing the first flow path and the second side facing the second flow path;
  - a third flow path connecting the first flow outlet to the second flow inlet;
  - a fourth flow path connecting the second flow outlet to the first flow inlet; and
- an electric circuit in electrical communication with the separation membrane and configured to apply a voltage between the first side of the separation membrane and the second side of the separation membrane.

* * * * *